(12) United States Patent
Johnson et al.

(10) Patent No.: US 7,331,855 B2
(45) Date of Patent: Feb. 19, 2008

(54) WIDE-SPREAD IMPELLER SPREADER FOR HARVESTING COMBINE

(75) Inventors: Peter Johnson, Moline, IL (US); Mark Pearson, LeClaire, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/484,410

(22) Filed: Jul. 11, 2006

(65) Prior Publication Data

US 2007/0015556 A1   Jan. 18, 2007

Related U.S. Application Data

(60) Provisional application No. 60/700,000, filed on Jul. 15, 2005.

(51) Int. Cl.
*A01F 12/49* (2006.01)
(52) U.S. Cl. ..................................... 460/112
(58) Field of Classification Search ............. 460/112, 460/111, 79, 901; 241/186.3; 239/665, 683, 239/681
See application file for complete search history.

(56) References Cited

U.S. PATENT DOCUMENTS

| | | | |
|---|---|---|---|
| 3,103,241 A | 9/1963 | Weigel | 146/107 |
| 4,614,197 A | 9/1986 | Weber et al. | 130/27 |
| 4,617,942 A * | 10/1986 | Garner | 460/112 |
| 5,082,186 A | 1/1992 | Bruns | 239/682 |
| 5,215,500 A | 6/1993 | Kirby | 460/111 |
| 5,976,011 A * | 11/1999 | Hartman | 460/111 |
| 6,070,816 A | 6/2000 | Hirsch | 241/101.742 |
| 6,079,643 A | 6/2000 | Hoyle | 239/681 |
| 6,238,286 B1 | 5/2001 | Aubry et al. | 460/111 |
| 6,251,009 B1 | 6/2001 | Grywacheski et al. | 460/112 |
| 6,331,142 B1 | 12/2001 | Bischoff | 460/112 |
| 6,406,368 B1 * | 6/2002 | Cruson et al. | 460/111 |
| 6,416,405 B1 | 7/2002 | Niermann | 460/79 |
| 6,656,038 B1 * | 12/2003 | Persson | 460/112 |
| 6,663,485 B2 | 12/2003 | Niermann | 460/79 |
| 7,008,315 B2 * | 3/2006 | Redekop et al. | 460/112 |
| 2003/0003974 A1 * | 1/2003 | Niermann et al. | 460/111 |

* cited by examiner

*Primary Examiner*—Árpád Fábián Kovács

(57) ABSTRACT

A chopper and wide-spread impeller spreader that feeds crop residue from the chopper into the spreader at a specific upward angle to more fully utilize the momentum the crop residue achieves in the chopper. The spreader incorporates air intake holes and air fins above the impellers to keep crop residue moving through the impellers without plugging of discharge material. The chopper propels the residue upwardly into the spreader resulting in a wide-spread broadcast, while preventing crop residue from plugging the spreader.

18 Claims, 6 Drawing Sheets

WIDE-SPREAD IMPELLER SPREADER FOR HARVESTING COMBINE

CROSS-REFERENCE TO RELATED APPLICATION

This application claims priority to U.S. provisional patent application 60/700,000 titled "Wide Spread Impeller Spreader for Harvesting Combine" filed on Jul. 15, 2005, and having at least one inventor in common with the present application.

FIELD OF THE INVENTION

The present invention relates to a mechanism for spreading crop residue from a harvesting combine, and more particularly to a chopper with an impeller-type spreader that has dual rotating circular spreader disks.

BACKGROUND OF THE INVENTION

A combine is a machine that is used in grain farming to harvest a variety of crops from a field. Combines are typically self-propelled, but some are also towed and powered by tractors. As a combine moves through a field during a harvesting operation, the ripened crop is cut from the field by a header at the front of the combine. The crop is then transferred into threshing and separating assemblies within the combine, where grain is removed from the crop material. The grain is separated from the chaff and brought to a hopper in the combine, or off-loaded to a truck or other storage mechanism. The residual crop material remaining after the grain has been removed is expelled from the rear of the combine, or chopped into smaller elements and then expelled from the rear of the combine. When harvesting, it is desirable that the crop residue be expelled along a path that is approximately the same width as the width of the crop that is cut by the header. This can be done with a variety of different types of chopping and spreading mechanisms. However, as the width of the cutting head has increased, there has been a need for spreading mechanisms that can achieve a spread width for the residual crop material that matches the width of the header and spreads the residual crop material generally evenly across that path width.

Some devices simply spread the material behind the machines; other chop the material into more evenly sized elements before spreading the material so as to achieve a more uniform distribution. Many devices, such as those disclosed in U.S. Pat. No. 6,251,009 to Grywacheski and U.S. Pat. No. 6,331,142 to Bischoff et al, incorporate a straw chopper and utilize a distributing device that has a series of guide vanes to disperse the residual crop material across a broader area. However, these types of systems do not work as well with very wide headers, as uniform distribution across the wider cutting path cannot be achieved using devices such as this. U.S. Pat. No. 5,082,186 to Bruns discloses a pair of rotating straw and chaff spreaders positioned behind the harvester. However, this device is directed to combines in which the straw and chaff are distributed in separate streams. In many modern combines, the straw and chaff are combined inside the combine and both processed through the straw spreader to provide a more uniform mixture of residual crop material to be distributed. U.S. Pat. No. 6,070,816 to Hirsch discloses a straw chopper comprised of two shaft-driven rotors that incorporate chopping blades into the housing of the rotor such that rotating crop material is chopped as it is rotated around on the rotors and comes in contact with the blades mounted around the inside of the housing. The material is rotated around the housing on the rotors, being chopped and then dispelled out behind the combine. However, it has been found that this mechanism, while an efficient utilization of space, cannot achieve a wide-spread distribution of crop material, owing to the necessity of chopping the material while it is being rotated inside of the chopper, and then deposited behind the machine.

Devices that utilize both a chopper mechanism and a separate impeller-type spreader attached aft of the chopper have been found to be more efficient in providing uniform spreading of crop material behind a combine in a wider path. A chopper and impeller-type spreader is an assembly attached to the rear of the combine that is adapted to receive crop residue expelled from the combine, process it through the chopper, cutting it into smaller pieces if necessary, and evenly broadcasting the residual crop material over a wide area of ground behind the combine. U.S. Pat. No. 5,215,500 to Kirby discloses a mechanism having an impeller-type spreader that receives straw and chaff crop residue material from the combine and spreads it behind the combine. However, this invention utilizes a single rotating impeller behind the combine. Such a mechanism provides only a limited width of spread behind the combine, and cannot achieve a sufficient width of spread to match the width of current cutting headers, thus resulting in an uneven spread of crop material behind the combine when the combine is used with modern wide-width cutting headers.

An impeller-type spreader typically comprises a right-side impeller and a left-side impeller that counter-rotate on parallel axes. Generally, distribution of crop residue from the right-side of the combine is attributed to the right-side impeller, and similarly, distribution of crop residue from the left-side of the combine is attributed to the left-side impeller. The overall width of crop residue distribution by the spreader is largely dependent on the rotational speed of the impellers. The higher the rotational speed of the impellers, the wider the resulting broadcast width. A number of chopper and impeller-type spreaders are known in the industry. For example, U.S. Pat. No. 6,238,286 to Aubry, et al., U.S. Pat. No. 6,416,405 to Niermann and U.S. Pat. No. 6,663,485 to Niermann all disclose systems in which crop residue material is routed from the chopper into a dual impeller-type spreader that is located below or in the same plane as the chopper. Such mechanisms work fairly efficiently. However, a mechanism that could better utilize the momentum of the residual crop material that is being dispersed from the chopper would achieve an improved area of dispersion of crop material behind the combine, which could more easily cover the entire width of the cutting header path.

When crop residue is broadcast by a spreader, it is desirable that the residue be spread evenly across the area that has just been harvested. Even distribution of crop residue ensures that the residue deteriorates and covers the field consistently, providing for uniform working of the ground, fertilization and crop emergence for the next year's crops. As the harvesting devices affixed to the front of a combine become wider and wider, it is more difficult to achieve an even distribution of crop residue across the entire width of the harvested rows. This is particularly true where the crop residue is very fine, very heavy, or moist. In some instances, spreaders of the current art can become clogged or not provide proper flow, and will produce an inconsistent crop residue spread. Thus an effective means of maintaining a constant wide spreader broadcast width and location, regardless of external or crop conditions, is desired.

SUMMARY OF THE INVENTION

Accordingly, it is an object of the present invention to provide a chopper with an impeller-type spreader that can distribute crop residue across a wide distribution path without clogging, providing inconsistent spreads, or generating spreads that do not cover the whole width of the harvested row.

The present invention achieves the desired broad distribution width by, among other things, altering the angle at which crop residue is fed from the chopper into the spreader, and providing air intake holes and air fins in the spreader to keep crop residue moving through the spreader impellers without plugging of discharge material. These improvements provide the desired wide-spread broadcast, while preventing crop residue from clogging or clumping in the spreader impeller.

The present invention is for use with a combine for harvesting grain that has a chopper for chopping crop residue. The invention is an impeller-type spreader for spreading chopped crop residue into the field behind the combine, with an angled discharge mechanism for discharging crop residue from the chopper outlet to the spreader inlet that is disposed at an angle relative to the vertically oriented rotational axes of the spreader, such that the crop residue is propelled upward into the impellers of the spreader mechanism at an angle of approximately 25 to 35 degrees. The spreader has a frame for attaching the mechanism to the combine, the frame having a housing on the upper portion thereof, and shrouds secured to an underside thereof around at least a portion of the impellers secured to the underside of the housing, the shrouds helping to guide and direct crop residue out of the impellers of the spreader mechanism such that a width of spread of crop residue is substantially the same as the width of the header on the combine.

DESCRIPTION OF THE PREFERRED EMBODIMENT

Figure 1:
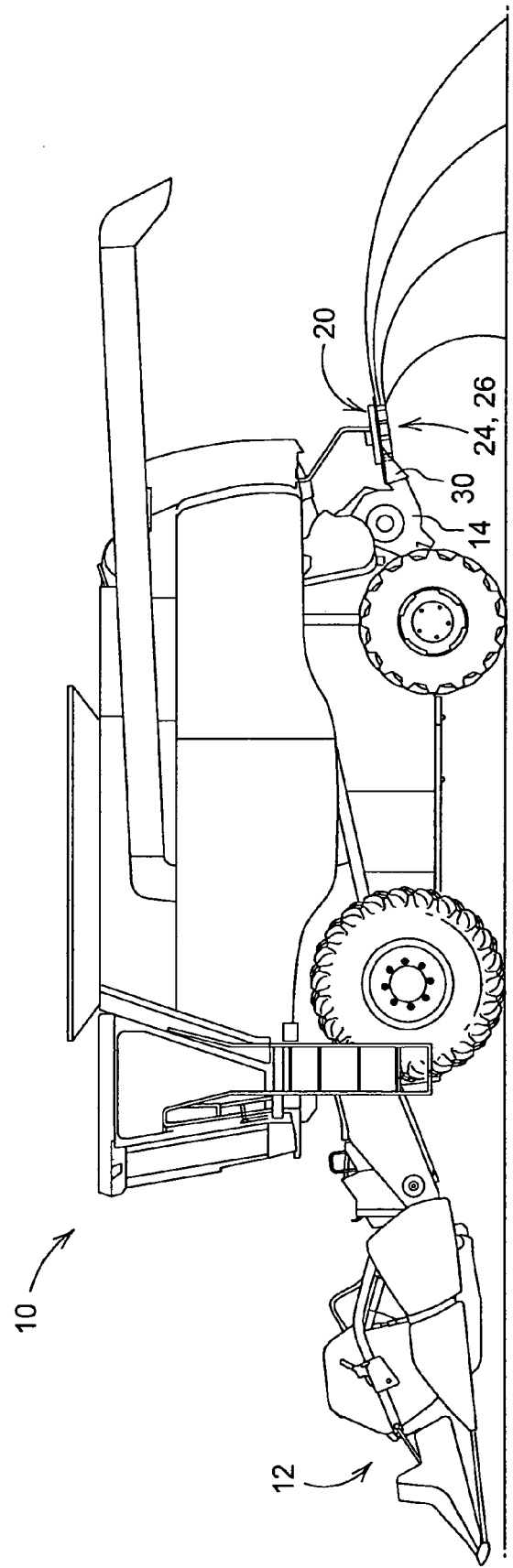
FIG. 1 is a side view of a combine shown with an impeller-type spreader.

FIG. 1 illustrates a combine 10 commonly used in grain farming to harvest a variety of crops. As a combine 10 moves through a field during a harvesting operation, the ripened crop is cut from the field by a header 12 at the front of the combine 10. The crop is then transferred into threshing and separating assemblies (not shown) within the combine 10, where grain is removed from the crop material. The grain is transferred and stored in a hopper (not shown) onboard the combine 10 until it can be off-loaded for transport. The crop material other than grain, which is referred to herein as crop residue, is further processed or chopped, and then broadcast over a wide area behind the combine 10 by a spreader 20 attached to the rear of the combine 10. For greater broadcast widths, spreaders 20 comprised of counter-rotating impellers 24 and 26 can be employed for this task.

Figure 2:
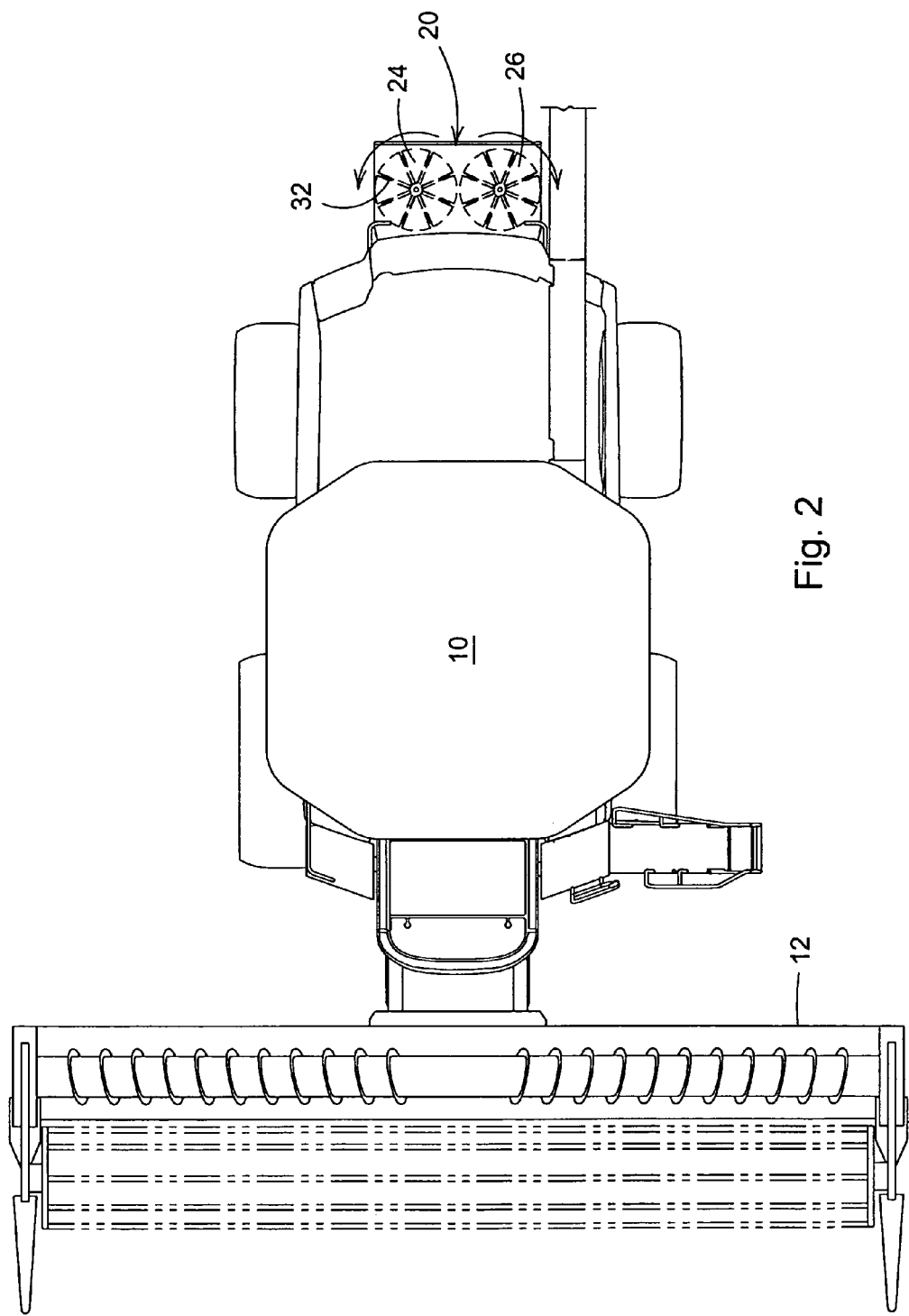
FIG. 2 is a top view of a combine with an impeller-type spreader showing direction of rotation of each impeller.
Figure 3:
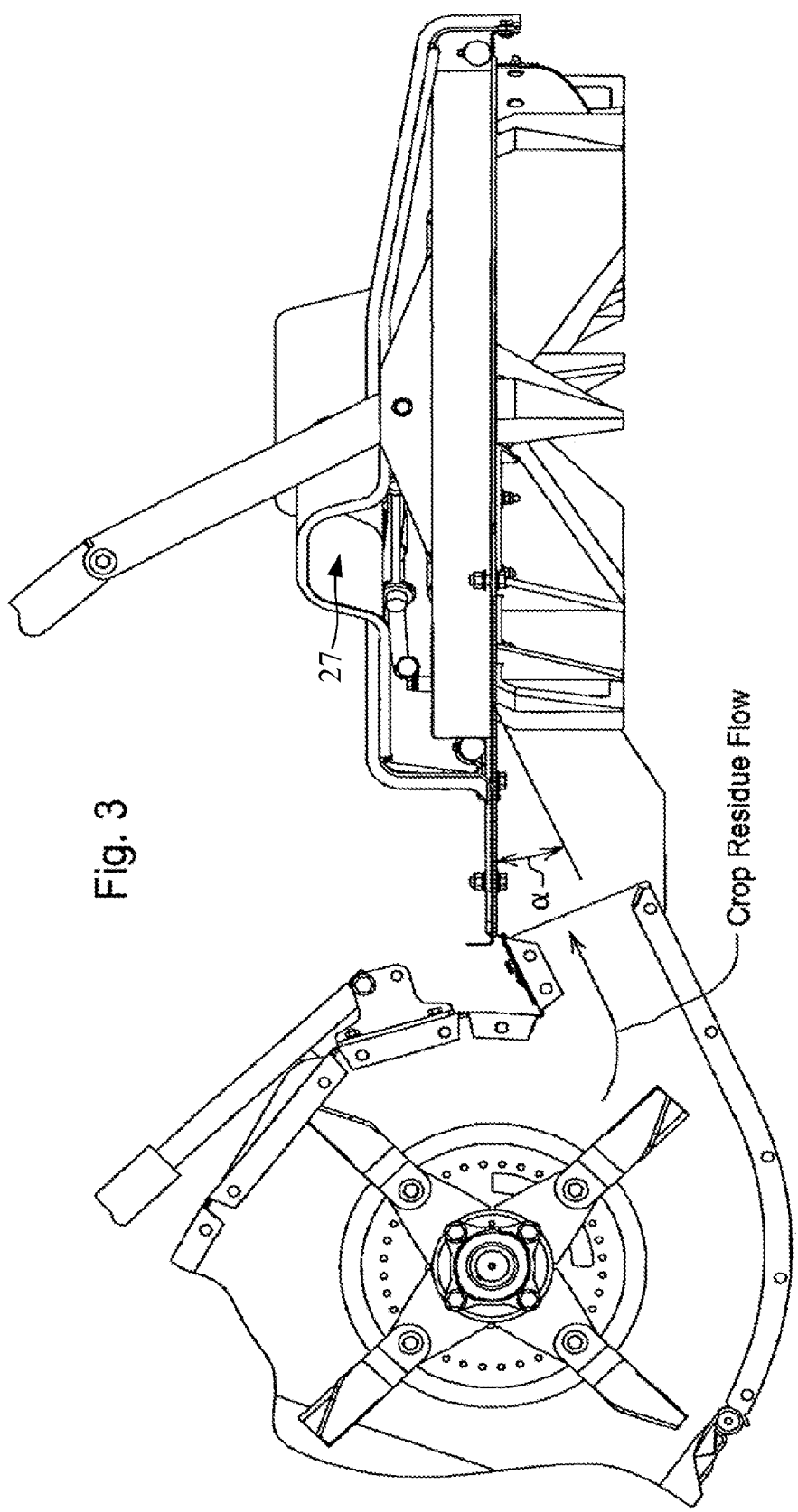
FIG. 3 is a side view of a combine chopper with an impeller-type spreader showing the angle at which the crop residue is propelled into the spreader impeller.

The spreader 20 comprises a right-side impeller 24, and a left-side impeller 26, that counter-rotate on parallel axes, as indicated by the direction of the avows in FIG. 2. Generally, the axes of rotation are oriented substantially vertically, but may also be inclined either forward or rearward to optimize spreader 20 performance. Typically, these impellers 24 and 26 are driven by hydraulic motors 27, which can also be understood to be electric motors 27 or other mechanical transmission means. As seen in FIG. 1, the spreader 20 is adapted to receive crop residue from the chopper 14 and evenly broadcast it over the entire combine harvesting pass. In operation, crop residue is expelled from the outlet of the chopper 14 into an angled discharge mechanism 30 which is disposed at an angle of approximately 55 to 65 degrees relative to the vertically oriented rotational axes of the spreader. In operation, the discharge mechanism 30 propels the crop residue upward into the counter-rotating impellers 24 and 26 of the spreader mechanism at an angle $\alpha$, which is approximately 25 to 25 degrees, as shown in FIG. 3. The impellers 24 and 26 receive the crop residue from the discharge mechanism 30 and broadcast it rearwardly and outwardly away from the combine 10 to achieve an even distribution of crop residue over the width of the combine or harvester. The total width and location of crop residue distribution by the spreader 20 is dependent, at least in part, on the rotational speed of the impellers 24 and 26. The higher the rotational speed of the impellers 24 and 26, the wider the resulting broadcast width.

Figure 4:
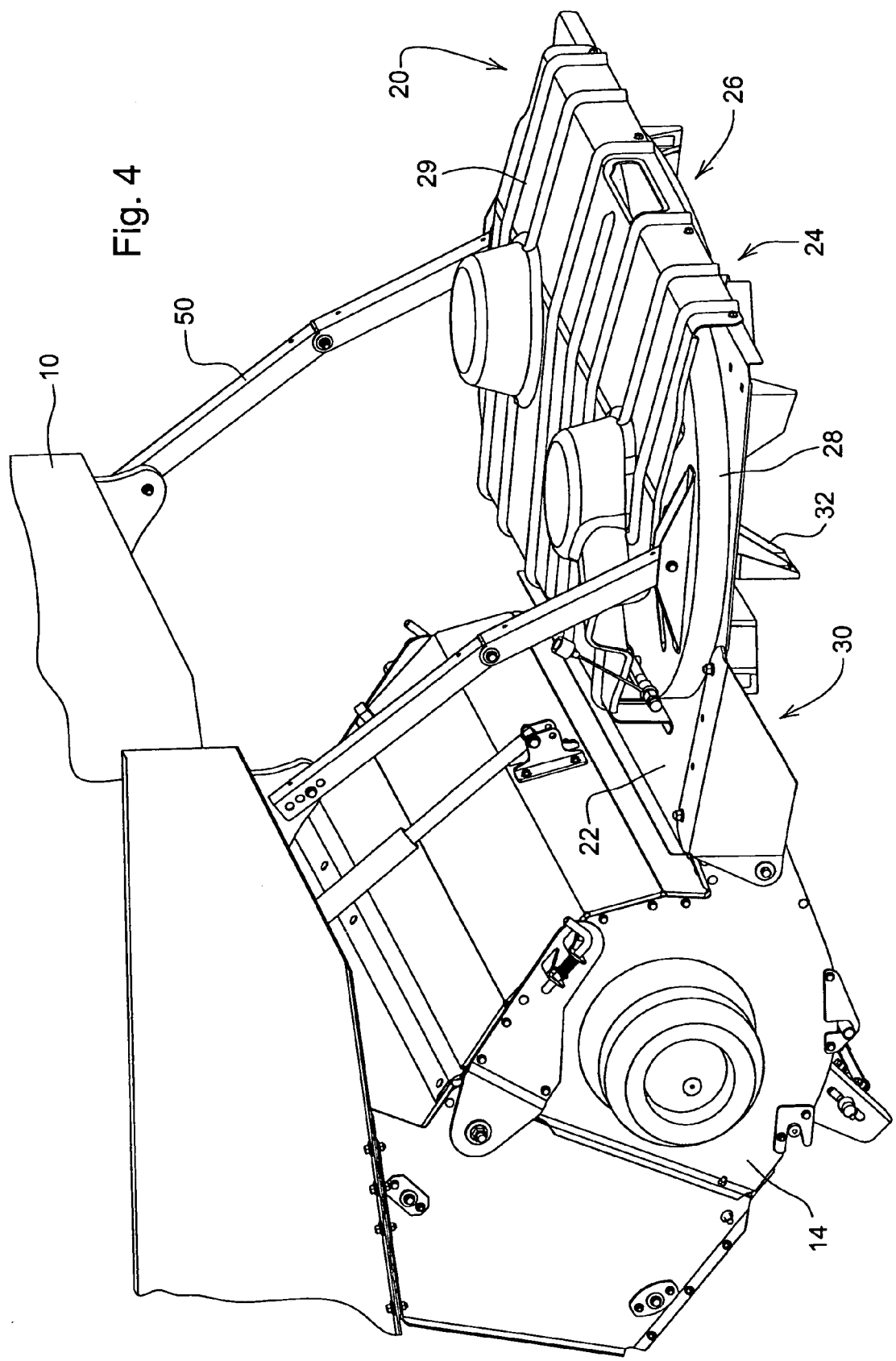
FIG. 4 is a perspective side view of an impeller-type spreader of the present invention.

FIG. 4 shows a view of the impeller-type spreader 20 of the present invention. The spreader 20 is enclosed in a frame 22 and has an upper housing 28 that covers the tops of the impellers 24 and 26. The impellers 24 and 26 are open to the bottom, and have downwardly extending impeller blades 32 that engage the crop residue. The spreader 20 is affixed to the rear of the combine 10 by means of securing struts 50 that secure the spreader 20 at a fixed distance and position behind the combine 10 to receive the crop residue from the chopper 14 via the angled discharge mechanism 30. In some arrangements of the present invention, the spreader 20 can be pivoted up and out of the way for transport purposes, but the position of the spreader 20 for operational purposes cannot be varied. Similarly, in other arrangements of the present invention, such as shown in FIG. 4, the securing struts 50 are multi-part suspension linkages that as a safety feature enable the spreader 20 to pivot upward in the response to the spreader 20 contacting another object in order to prevent damage to the spreader. The spreader is in a fixed position that cannot be varied for operational purposes.

As can be seen in this view, crop residue is fed from the chopper 14 outlet into the angled discharge mechanism 30 and directed from there into the inlet of the spreader 20 of the present invention. The spreader 20 is oriented vertically above and rearward of the chopper 14. The discharge mechanism 30 is disposed at an angle of 55 to 65 degrees relative to the vertically oriented rotational axes of the spreader 20. The angled discharge mechanism 30 is designed to converge the crop residue at the inlet of the spreader 20 for entrance into the impellers 24, 26 at an angle $\alpha$, which is approximately 25 to 35 degrees, and more preferably 30 degrees. In order to obtain a greater width of spread, the angle $\alpha$ at which the crop residue enters the spreader 20 is critical.

By feeding the crop residue at the specified upward angle to the impellers 24, 26, the crop residue is able to more fully engage the impellers 24, 26 and impeller blades 32 by better utilizing the energy with which the crop residue is being propelled into the impellers 24, 26 from the chopper 14 outlet, resulting in a more even distribution and a greater width of distribution of crop residue behind the combine. Because the crop residue has increased momentum as it travels through the chopper 14 and angled discharge mechanism 30 to be expelled up into the spreader 20, it will continue to move through the spreader 20 at a fast rate of speed and can be distributed outwards onto the field behind the combine 10 in a broad path because the momentum of the crop residue is utilized in expelling in from the spreader 20. This improvement provides an increased spread-width not seen in previous impeller-type spreader mechanisms that fed crop residue vertically down into a spreader located below the chopper, or were otherwise located such that crop residue was fed perpendicularly into the spreader, or devices in which the chopper outlet and spreader were in substantially the same plane. This enhancement, in conjunction with additional improvements to the spreader mechanism described below are responsible for the improved productivity seen with this invention. This invention, by maximizing utilization of the momentum the crop material achieves while being processed through the combine 10 and chopper 14 provides the ability to wide-broadcast spread crop residue behind the combine 10 in a path reflecting that of the wide headers used today without the need to provide additional torque or energy to the operation that could be used for other combine 10 operations.

Figure 5:
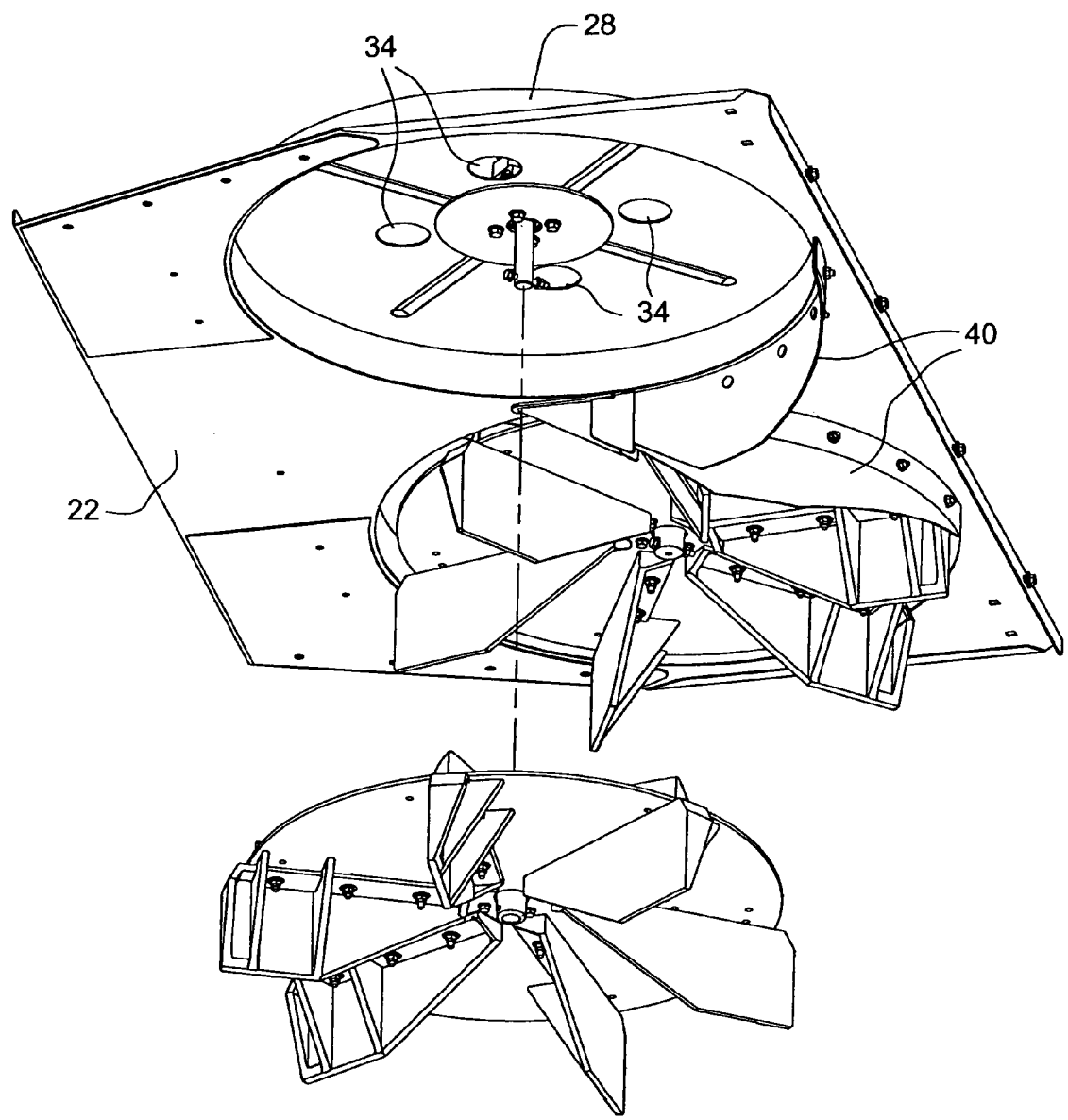
FIG. 5 is a exploded perspective bottom view of the impeller-type spreader of the present invention.

The direction and width of distribution of crop residue can be varied in a number of ways. One way to vary the width of the crop residue distribution is to alter the speed of the impeller 24, 26 rotation. When the impellers 24, 26 are rotating at a greater speed, the crop residue is distributed out across a greater width. Other features that can be varied to change the direction of crop residue distribution would be to alter the position of the impeller blades 32 in the housing. When the blades 32 are oriented in a neutral position, as seen in FIG. 5, the blades form right angles with respect to the center lines of the impellers 24, 26. Alternatively, the blades can be oriented in a retarded position, forming an acute angle with respect to the center lines of the impellers 24, 26, or a mix of blades in the neutral and retarded positions can be used. As can be appreciated, the mounting position of the impeller blades 32 on the impellers will also help determine the direction and speed of the crop residue distribution. Additionally, if the shroud 40 were repositioned, the area over which crop residue is distributed would be altered.

As can be seen in FIG. 5, the housing 28 has several holes 34 cut down to the area in which the impellers are suspended. The purpose of these holes 34 is to allow airflow through the spreader 20 to prevent crop residue from clogging the impeller blades 32. It should be noted that while there are four through-material holes shown in this figure, the number of holes and exact position of the holes can vary, depending on the particular arrangement of the present invention. Additionally, a cover 29 typically covers the holes 34 in a way so as to prevent by a person or other materials into the holes 34 and the rotating impellers below, as seen in FIG. 4. As can be seen in FIG. 5, a shroud 40 surrounds at least a portion of the inside and rear of each impeller 24, 26, so that crop residue is directed out the outside of the spreader 20. It should be noted that the exact size, shape, and position of the shroud 40 can vary depending upon the specific arrangement of the present invention.

Figure 6:
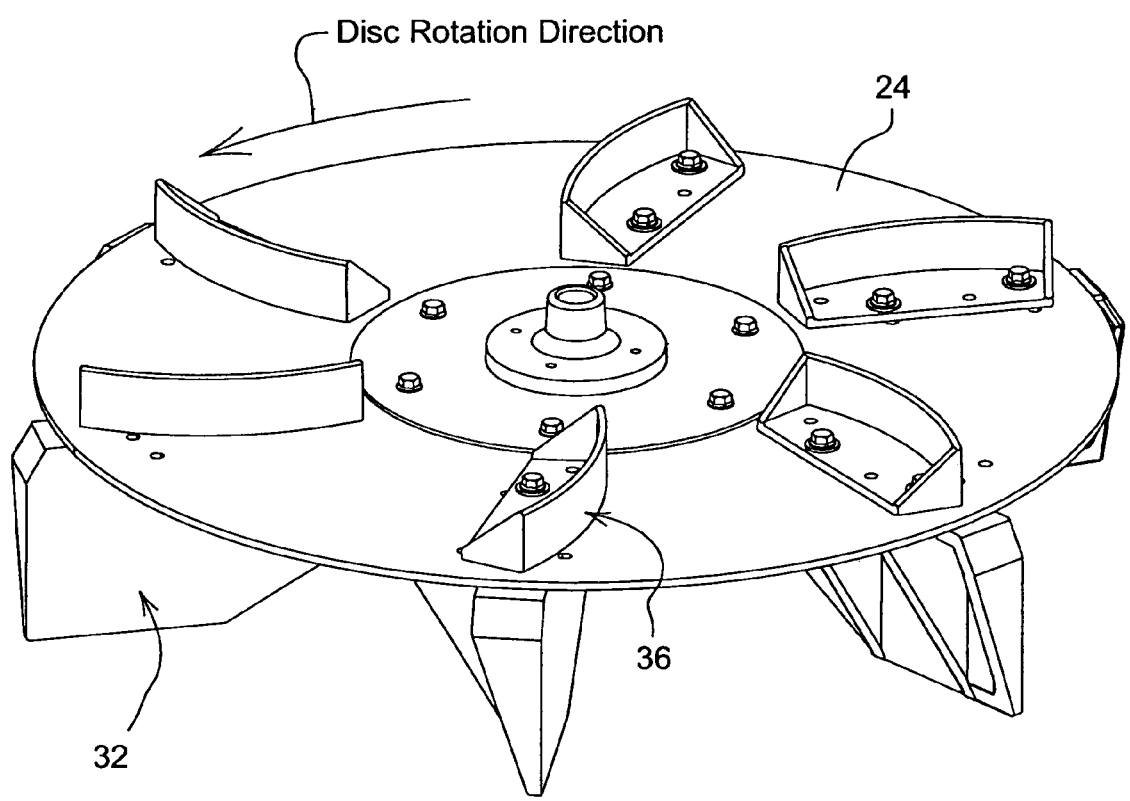
FIG. 6 is a detailed view of an impeller mechanism of the present invention.

FIG. 6 shows a detailed view of an impeller 24 of the present invention. As can be seen, the impeller 24 has air fins 36 secured to the top of the impeller 24, the air fins 36 being oriented in the direction of air flow with the rotation of the impeller 24. The air fins 36 draw air through the holes 34 and forces it over the outer edges of the impellers 24, 26, thus preventing the discharge from the chopper 14 from entering the cavity between the impellers 24, 26 and the frame 22 and building up to a level that prevents rotation of the impellers 24, 26, thus limiting the evenness of distribution or the distribution-width of the crop residue. The air intake holes 34 and fins 36 serve to keep the crop residue moving through the impellers 24, 26 without clogging or plugging of the crop residue material. These improvements further increase the efficiency of the spreader in distributing crop residue in a broad path behind the spreader. The impeller blades 32 secured to the bottom of the impeller 24 can also be seen in FIG. 6. Although the present invention is illustrated as having six impeller blades 32 per impeller 24, and six air fins 36 per impeller 24, other arrangements have been found satisfactory including four, five or eight impeller blades 32 per impeller 24, and one or more air intake holes 34 in the housing 28. For the left hand impeller 26 (not shown), it can be appreciated that because the direction of rotation is different, the orientation of the air fins 36 and impeller blades 32 and location of the air holes 34 would also be different for proper flow of air and crop residue.

Having described the preferred embodiment, it will become apparent that various modifications can be made without departing from the scope of the invention as defined in the accompanying claims.

We claim:

1. In a combine for harvesting grain having a harvesting head attached thereto, an apparatus for conveying crop residue from a chopper in a wide-distribution path behind a rear of the combine, the apparatus comprising:
    an impeller-type spreader mechanism having a frame for attaching the spreader mechanism to the rear of the combine by means of securing struts, the spreader mechanism having a housing secured to the frame, and having at least two rotating impellers secured beneath the housing, each impeller having at least one impeller blade secured to a bottom thereof, the impellers capable of counter-rotating within the frame to disperse the crop residue propelled into the spreader mechanism out the side and rear of the spreader by means of the rotating impeller blades; and
    an angled discharge mechanism disposed at an angle of approximately 55 to 65 degrees relative to vertically-oriented rotational axes of the spreader mechanism, the angled discharge mechanism arranged for receiving crop residue from an outlet of the combine chopper and propelling the crop residue upward into the impellers of the spreader at an angle.

2. The apparatus of claim 1 wherein the rotating impellers are driven by hydraulic motors.

3. The apparatus of claim 1 wherein the rotating impellers are driven by electric motors.

4. The apparatus of claim 1 wherein the impeller-type spreader broadcasts the crop residue behind the combine in a path having a width approximately equal to that of the combine header.

5. The apparatus of claim 1 wherein the speed of the rotating impellers can be varied.

6. The apparatus of claim 1 wherein a shroud is positioned around at least a portion of each impeller.

7. The apparatus of claim 1 wherein the housing has through-material holes to provide for the flow of air into the impellers.

8. The apparatus of claim 1 wherein the impeller-type spreader further comprises a cover over the housing.

9. The apparatus of claim 1 wherein the crop residue is propelled upward into the impellers of the spreader at an angle of approximately 25 to 35 degrees.

10. The apparatus of claim 1 wherein the crop residue is propelled upward into the impellers of the spreader at an angle of approximately 30 degrees.

11. In a combine for harvesting grain having a harvesting head attached thereto, an apparatus for conveying crop residue from a chopper in a wide-distribution path behind a rear of the combine, the apparatus comprising:

an impeller-type spreader mechanism having a frame for attaching the spreader mechanism to the rear of the combine by means of securing struts, the spreader mechanism having a housing secured to the frame, and having at least two rotating impellers secured beneath the housing, each impeller having at least one impeller blade secured to a bottom thereof, the impellers capable of counter-rotating within the frame to disperse the crop residue propelled into the spreader mechanism out the side and rear of the spreader by means of the rotating impeller blades; and an angled discharge mechanism disposed at an angle of approximately 55 to 65 degrees relative to a vertically-oriented rotational axes of the spreader mechanism, the angled discharge mechanism arranged for receiving crop residue from an outlet of the combine chopper and propelling the crop residue upward into the impellers of the spreader at an angle, said impeller-type spreader further including a cover over the housing each impeller having at least one air fin secured to a top thereof for moving air drawn into the through-material holes in the housing over the outer edge of the impeller.

12. A method for spreading crop residue behind a combine having a harvesting head for harvesting grain, the method comprising:

feeding crop residue from an outlet of a chopper in the combine into an angled discharged mechanism;

propelling the crop residue from the angle discharge mechanism upward into an impeller-type spreader mechanism having at least two impellers having impeller blades on an underside thereof at an angle of approximately 25 to 35 degrees such that the momentum the crop residue achieved being discharged from the chopper is utilized in moving the crop residue through the impeller blades; and rotating the crop residue through the impeller blades and dispersing the crop residue out the side and rear of the spreader behind the combine with sufficient momentum that the crop residue is spread in path approximately equal in width to the width of the combine header.

13. The method of claim 12 wherein the impellers are driven by at least one motorized mechanism to achieve a rotational speed.

14. The method of claim 12 wherein a housing having at least one through-material hole is positioned above the impeller-type spreader mechanism to direct air flow into the impeller to prevent a build-up of crop residue in the spreader.

15. The method of claim 12 wherein at least one of the impeller blades is oriented so as to form an acute angle with respect to a center line of the impeller so as to alter the direction of crop residue distribution out of the impeller.

16. The method of claim 12 wherein the rotational speed of the impeller is altered to change the width of the crop residue distribution path.

17. A method for spreading crop residue behind a combine having a harvesting head for harvesting grain, the method comprising:

feeding crop residue from an outlet of a chopper in the combine into an angled discharged mechanism;

propelling the crop residue from the angle discharge mechanism upward into an impeller-type spreader mechanism having at least two impellers having impeller blades on an underside thereof at an angle of approximately 25 to 35 degrees such that the momentum the crop residue achieved being discharged from the chopper is utilized in moving the crop residue through the impeller blades; and rotating the crop residue through the impeller blades and dispersing the crop residue out the side and rear of the spreader behind the combine with sufficient momentum that the crop residue is spread in path approximately equal in width to the width of the combine header, wherein a housing having at least one through-material hole is positioned above the impeller-type spreader mechanism to direct air flow into the impeller to prevent a build-up of crop residue in the spreader, wherein each impeller has at least one air fin secured to a top thereof for moving air drawn into the through-material holes in the housing over the outer edge of the impeller to prevent a build-up of crop residue in the impeller blades.

18. A combine for harvesting grain having a chopper for chopping crop residue, an upwardly angled discharge mechanism for discharging crop residue from the chopper into an impeller-type spreader mechanism for spreading discharged crop residue behind the combine, the discharge mechanism positioned such that the crop residue is into an at least one rotating impellers in the spreader mechanism at an angle of from approximately 25 to 35 degrees, the spreader mechanism having a frame for attaching the spreader mechanism to the combine, the frame having through-material holes therein for the flow of air therethrough, a housing on the upper portion thereof, and shrouds secured thereto to help guide and direct crop residue out of the impellers of the spreader mechanism, the impellers each having at least one impeller blade secured to the bottom thereof, and at least one air fin secured to the top thereof, the impellers capable of counter-rotating within the frame to propel crop residue propelled therein from the discharge mechanism out the side and rear of the spreader by means of the rotating impeller blades, the air fins used for directing air flow from the frame holes around the impellers to prevent crop residue build up between the frame and the impellers.

* * * * *